US012313243B1

(12) United States Patent
Hsu

(10) Patent No.: US 12,313,243 B1
(45) Date of Patent: May 27, 2025

(54) LIGHTING DEVICE

(71) Applicant: DONGGUAN JIASHENG LIGHTING TECHNOLOGY CO., LTD., Guangdong (CN)

(72) Inventor: Chih-Pin Hsu, Dongguan (CN)

( * ) Notice: Subject to any disclaimer, the term of this patent is extended or adjusted under 35 U.S.C. 154(b) by 0 days.

(21) Appl. No.: 18/885,689

(22) Filed: Sep. 15, 2024

(30) Foreign Application Priority Data

Aug. 8, 2024 (CN) ........................ 202421920500.2

(51) Int. Cl.

| | |
|---|---|
| ***F21V 15/01*** | (2006.01) |
| ***F21V 7/05*** | (2006.01) |
| ***F21V 23/00*** | (2015.01) |
| ***F21V 23/04*** | (2006.01) |
| ***F21Y 113/00*** | (2016.01) |

(52) U.S. Cl.

CPC ................ *F21V 15/01* (2013.01); *F21V 7/05* (2013.01); *F21V 23/003* (2013.01); *F21V 23/0485* (2013.01); *F21Y 2113/00* (2013.01)

(58) Field of Classification Search

CPC .......... F21V 15/01; F21V 7/05; F21V 23/003; F21V 23/0485

USPC ........................................................ 362/227

See application file for complete search history.

(56) References Cited

U.S. PATENT DOCUMENTS

| | | | | | |
|---|---|---|---|---|---|
| 5,255,165 | A * | 10/1993 | Cail | B60Q 1/442 | 362/397 |
| D415,718 | S * | 10/1999 | Aghaci | D12/91 | |
| D434,364 | S * | 11/2000 | Bauer | D12/412 | |
| 6,616,312 | B2 * | 9/2003 | Carter | B60Q 1/247 | 362/232 |
| 12,181,128 | B2 * | 12/2024 | Li | F21V 23/0464 | |
| 2008/0087059 | A1 * | 4/2008 | Lee | B60R 9/058 | 70/258 |
| 2010/0079998 | A1 * | 4/2010 | Mrakovich | F21V 29/75 | 362/249.02 |
| 2016/0146405 | A1 * | 5/2016 | Kim | F21V 23/002 | 362/249.02 |
| 2022/0112995 | A1 * | 4/2022 | Li | H05B 47/11 | |

* cited by examiner

*Primary Examiner* — Bryon T Gyllstrom
(74) *Attorney, Agent, or Firm* — Addison D. Ault; IPGentleman Intellectual Property Services, LLC

(57) ABSTRACT

Disclosed is a lighting device, including a base, a top plate, a power supply unit and pillars, where the top plate is located above the base and is arranged corresponding to the base, the power supply unit is fixed on the base, both ends of each of the pillars are fixedly connected to the base and the top plate, a first lighting unit is arranged on a side of one of the pillars facing an interior of the lighting device, and the first lighting units are electrically connected to the power supply unit. A plurality of frames capable of displaying an internal space of the lighting device is formed by cooperating between the pillars and the base and the top plate, the first lighting units in different directions are arranged to achieve a lighting function, and the power supply unit is integrated into the base to provide a charging function.

9 Claims, 12 Drawing Sheets

LIGHTING DEVICE

TECHNICAL FIELD

The present disclosure relates to the technical field of devices for providing lighting, and particularly relates to a lighting device.

BACKGROUND

Lighting devices bring brightness to people, extend the time available for daily activities, and are extensively used in daily life. However, the lighting devices in the prior art emit light from a single angle, which cannot provide lighting effects from multiple angles. Moreover, the existing lighting devices often provide only lighting functions, making them unable to meet demands of users for multifunctional products, thus restricting their actual application scenarios.

Therefore, the prior art needs to be further improved and enhanced.

SUMMARY

In view of the defects in the prior art, an objective of the present disclosure is to provide a lighting device, to solve the problems in the prior art that the lighting device emits light from a single angle, has a single function, and has limited application scenarios.

In order to achieve the foregoing objective, the present disclosure adopts the following technical solutions:

the present disclosure provides a lighting device, including:

a base;

a top plate, where the top plate is located above the base and is arranged corresponding to the base;

a power supply unit, where the power supply unit is fixed on the base; and pillars, where both ends of each of the pillars are fixedly connected to the base and the top plate, a first lighting unit is arranged on a side of one of the pillars facing an interior of the lighting device, and the first lighting unit is electrically connected to the power supply unit.

In an embodiment, the lighting device further includes a rear plate, where the rear plate is detachably connected to both the base and the top plate, and a second lighting unit is arranged on a side of the rear plate facing the interior of the lighting device.

In an embodiment, a third lighting unit is arranged on the top plate facing the base, and the third lighting unit is fixed between the adjacent pillars and is electrically connected to the power supply unit.

In an embodiment, the lighting device includes:

a charging device, where the charging device is arranged in a center position on a top surface of the base, and is configured to charge an object placed inside the lighting device;

a charging power supply, where the charging power supply is fixed inside the base, a charging port is formed on a side wall of the base, and the charging power supply is electrically connected to the power supply unit, the first lighting unit and the third lighting unit; and a control device, where the control device is fixed inside the base and extends out from the top surface of the base, the control device is electrically connected to the charging device, the first lighting unit, and the third lighting unit, so as to control on/off of the charging device, the first lighting unit, and the third lighting unit, and to adjust brightness levels of the first lighting unit and the third lighting unit.

In an embodiment, the charging device a wireless charger, and the control device is a touch controller.

In an embodiment, the lighting device further includes a fourth lighting unit, and the fourth lighting unit includes:

a main body, where the main body is detachably connected to the charging device, and is capable of supplying power to the fourth lighting unit through the charging device;

an audio assembly, where the audio assembly is fixed inside the main body for providing an audio playback function for the fourth lighting unit;

a lighting assembly, where the lighting assembly is fixed above the main body for providing a lighting function for the fourth lighting unit; and a control assembly, where the control assembly is electrically connected to the audio assembly and the lighting assembly for controlling on/off and working states of the audio assembly and the lighting assembly.

In an embodiment, the rear plate further includes:

a mirror structure, where the mirror structure is fixed on a side of the rear plate facing the interior of the lighting device, and the second lighting unit is fixed between the mirror structure and the rear plate;

a power supply interface, where the power supply interface is arranged corresponding to the top plate, and is electrically connected to the first lighting unit and the third lighting unit; and charging interfaces, where the charging interfaces are arranged on the rear plate and are connected to an external power source to supply power to the second lighting unit and the power supply interface.

In an embodiment, each of the pillars includes:

a pillar body, where two ends of the pillar body are fixedly connected to the base and the top plate;

a fixed rod, where the fixed rod is fixed inside the pillar body and extends out from two ends of the pillar body, and are fixedly connected to the base and the top plate; and the first lighting unit, where the first lighting unit is fixed on a side of the pillar body facing the interior of the lighting device.

In an embodiment, a first positioning groove corresponding to a bottom end of the pillar body is formed on the base, and a first fixing groove corresponding to a bottom end of the fixing rod is formed at a bottom of the first positioning groove, such that a connection between the base and the pillars is realized; and a second positioning groove corresponding to a top end of the pillar body is formed on the top plate, and a second fixing groove corresponding to a top end of the fixing rod is formed at a bottom of the second positioning groove, such that a fixed connection between the top plate and the pillars is realized.

In an embodiment, a handle is fixedly arranged at a top of the top plate.

Compared with the prior art, the present disclosure provides a lighting device, including a base, a top plate, a power supply unit, and pillars. Specifically, the top plate is located above the base and is arranged corresponding to the base, the power supply unit is fixed on the base, both ends of each of the pillars are fixedly connected to the base and the top plate, a first lighting unit is arranged on a side of one of the pillars facing an interior of the lighting device, and the first lighting unit is electrically connected to the power supply unit. In the present disclosure, a plurality of frames capable of displaying an internal space is formed by combining the pillars with the base and the top plate, in addition, the first lighting units in different directions are arranged to achieve the lighting function, the power supply unit is integrated into the base to provide a charging function, which not only ensures that the lighting device can provide illumination from various angles, but also enables the lighting device to charge the object placed inside. By combining with the lighting function, the user can showcase the object placed inside the lighting device in a more delicate and aesthetical manner, enriching use scenarios for the lighting device.

DETAILED DESCRIPTIONS OF THE EMBODIMENTS

Figure 1:
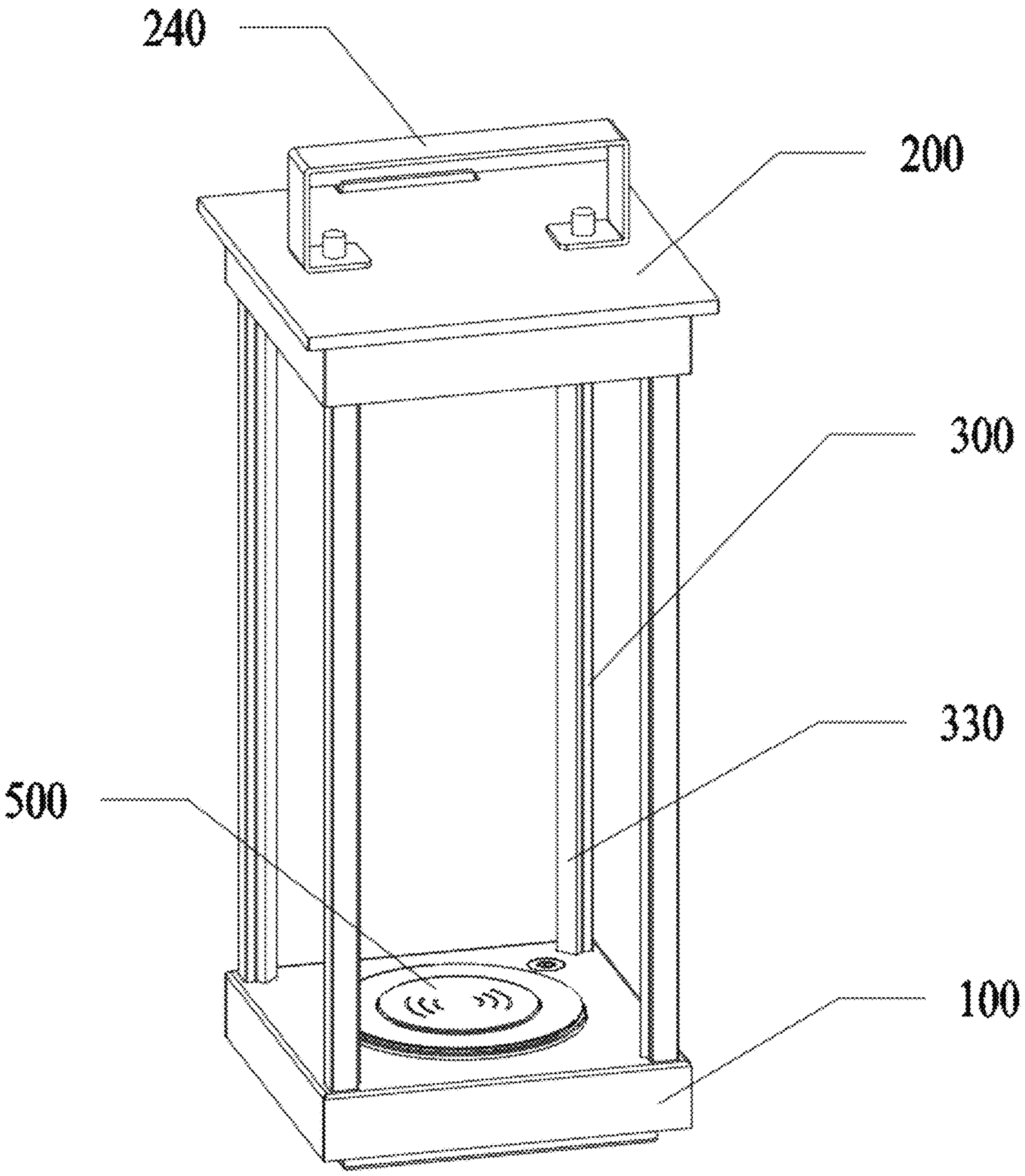
FIG. 1 is a perspective view of a lighting device according to one embodiment of the present disclosure.

The present disclosure provides a lighting device. In order to make the objectives, technical solutions, and effects of the present disclosure clearer, the present disclosure will be further described in detail below with reference to the accompanying drawings and examples. It should be understood that the specific embodiments described herein are merely used to explain the present disclosure and are not intended to limit the present disclosure.

It should be noted that the terms "center", "upper", "lower", "left", "right", "inner", "outer", "vertical", "horizontal", etc. indicate azimuthal or positional relations on the basis of those shown in the drawings only for ease of description of the present disclosure and for simplicity of description, and are not intended to indicate or imply that the referenced structure must have a particular orientation and be constructed in a particular orientation, and thus may not be construed as a limitation on the present disclosure.

In addition, unless otherwise specified for the articles in the context, "a/an" and "the" can generally refer to either a single or multiple instances. Under the condition that examples of the present disclosure involve descriptions of "first", "second", etc., the descriptions of "first", "second", etc. are for descriptive purposes only and are not to be construed as indicating or implying their relative importance or implicitly specifying the number of indicated technical features. Thus, a feature defined with "first" and "second" may explicitly or implicitly includes at least one of the features. In addition, the technical solutions of the embodiments may be combined with one another, which must be based on the achievement by those of ordinary skill in the art, and when the combinations of the technical solutions contradict one another or cannot be achieved, it should be considered that the combinations of the technical solutions do not exist and do not fall within the scope of protection claimed in the present disclosure.

Figure 2:
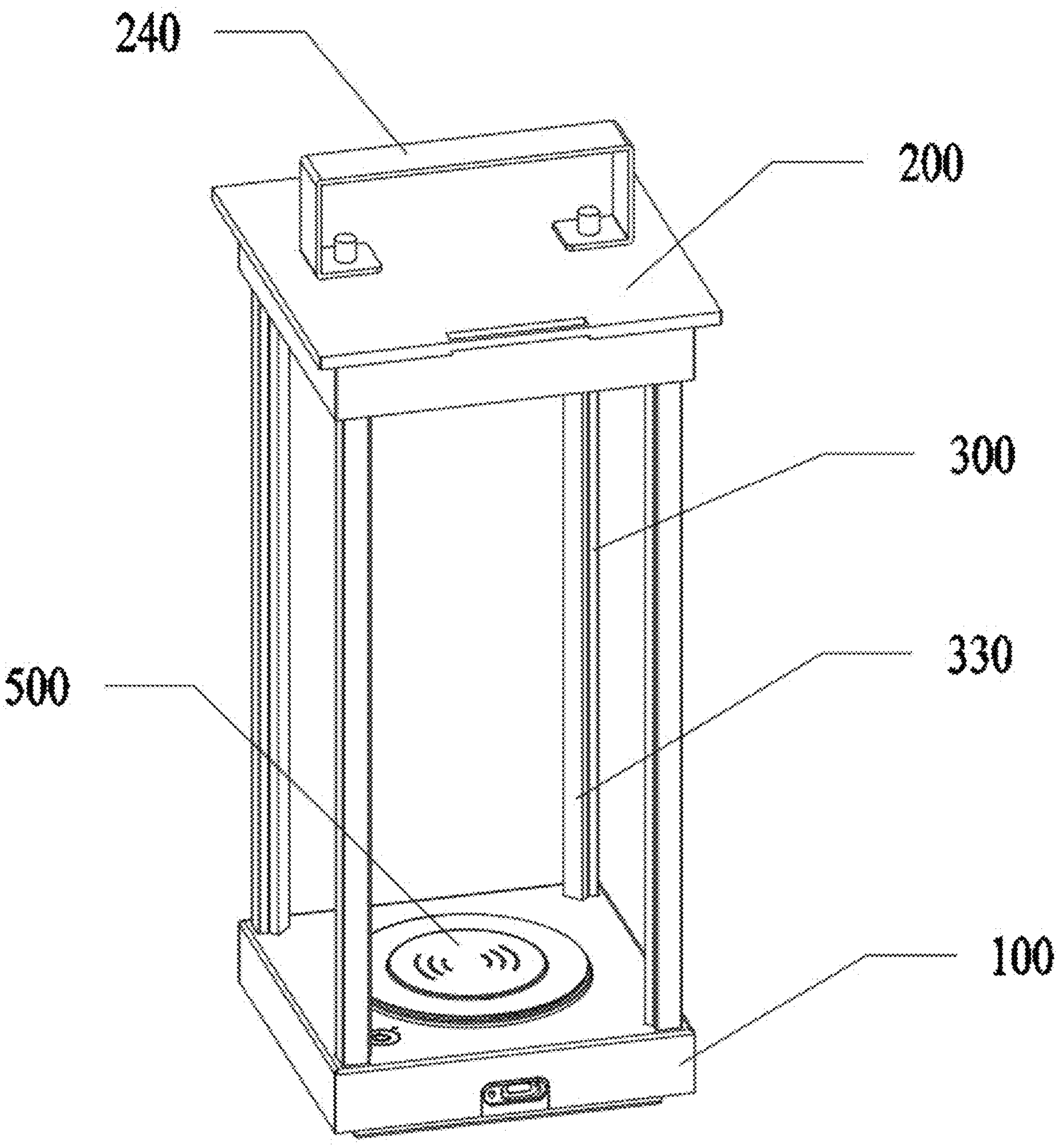
FIG. 2 is a perspective view of a lighting device according to one embodiment of the present disclosure from another angle.

The present disclosure provides a lighting device. As shown in FIGS. 1 and 2, the lighting device includes a base 100, a top plate 200, pillars 300, and a power supply unit 500, where the top plate 200 is located above the base 100 and is arranged correspondingly according to a shape of the base 100, two ends of each of the pillars 300 are fixedly connected to the base 100 and the top plate 200, respectively. The pillars 300, in conjunction with the base 100 and the top plate 200, form an overall frame of the lighting device, and form a plurality of windows capable of displaying an interior space of the lighting device, such that a user can directly view an object placed inside the lighting device. Further, a first lighting unit 330 is arranged on a side of each of the pillars 300 facing an interior of the lighting device, and the first lighting unit 330 is arranged in different directions according to different positions of the pillars 300, which not only provides illumination from various angles, but also illuminates the object inside the lighting device, achieving an excellent display effect. Further, the power supply unit 500 is fixed on the base 100 and is electrically connected to the first lighting unit 330, such that power supply to the lighting device can be realized, and the charging function for the object placed inside the lighting device can be realized. Through a structural design inside the lighting device, the present disclosure ensures that the lighting device can provide illumination from different angles, displays the object inside the lighting device and charge the object. By combining with the lighting function, the user can showcase the object placed inside the lighting device in a more delicate and aesthetical manner, enriching use scenarios for the lighting device.

Figure 10:
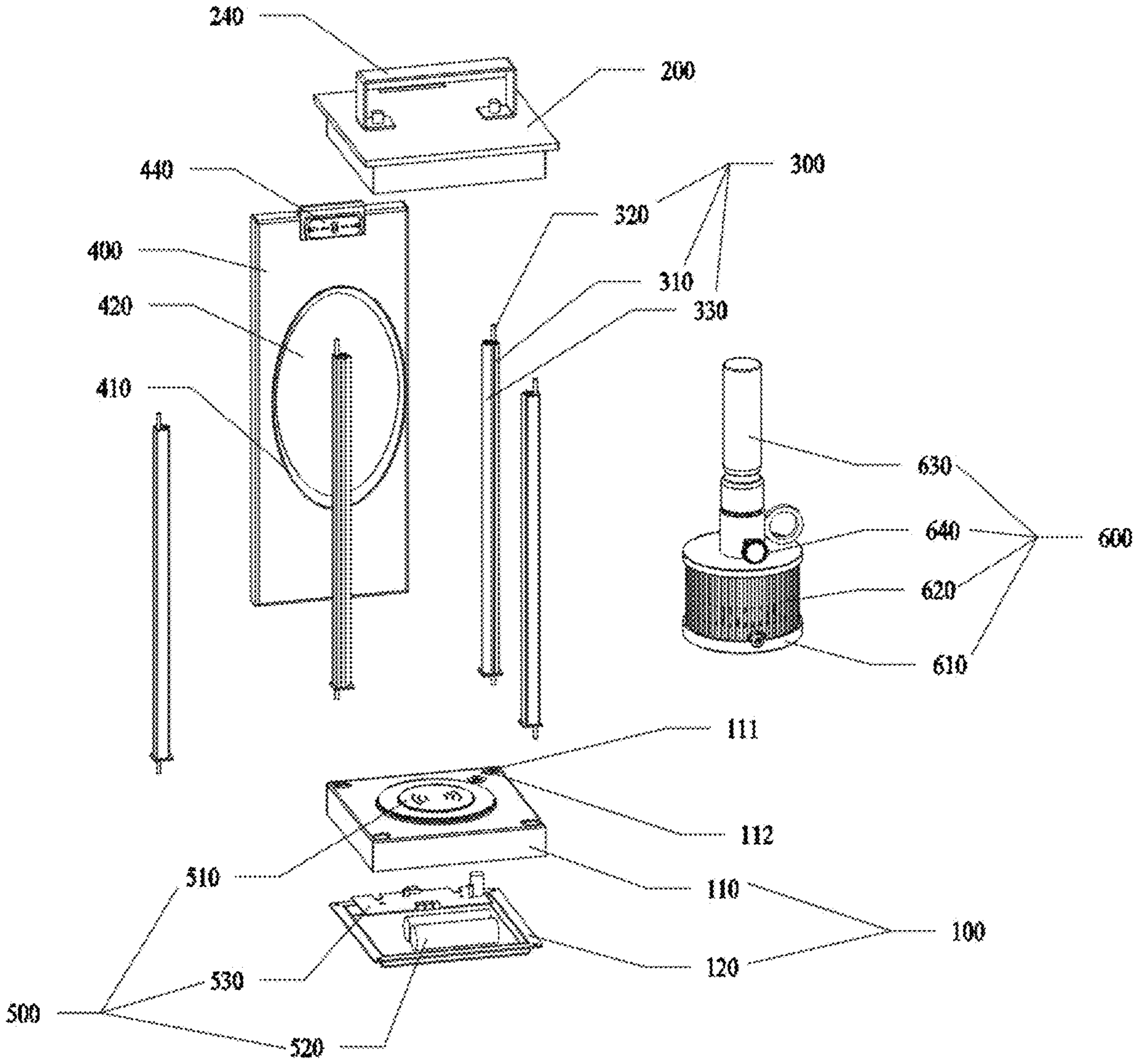
FIG. 10 is an exploded view of a lighting device according to yet another embodiment of the present disclosure.
Figure 11:
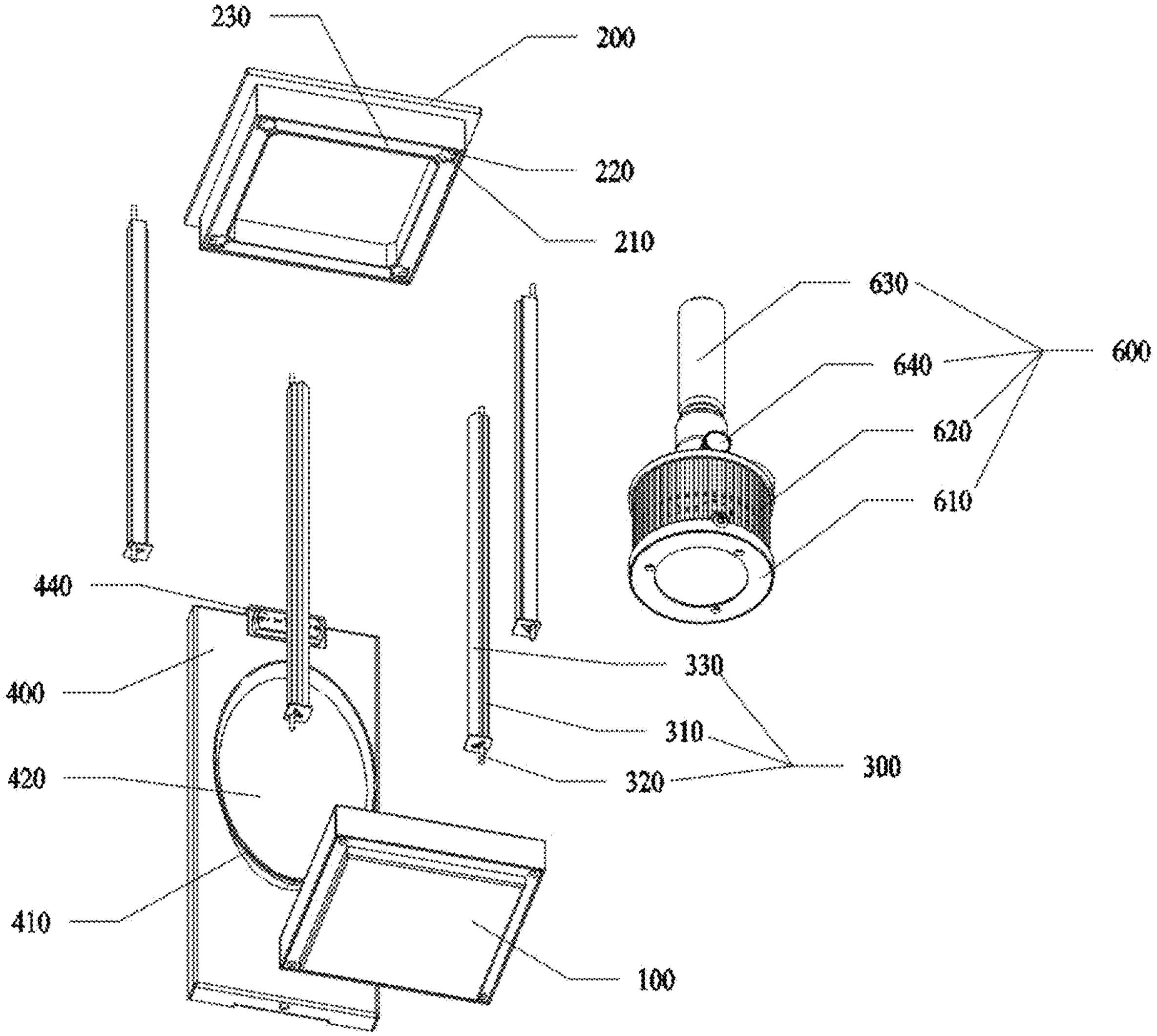
FIG. 11 is an exploded view of a lighting device according to yet another embodiment of the present disclosure from another angle.

Further, as shown in FIGS. 10 and 11, each of the pillars 300 includes a pillar body 310, a fixing rod 320, and the first lighting unit 330, where two ends of the pillar body 310 are fixedly connected to the base 100 and the top plate 200, respectively, the fixing rod 320 is fixed inside the pillar body 310 and extends out from two ends of the pillar body 310, and is then fixedly connected to the base 100 and the top plate 200; and the first lighting unit 330 is fixed on a side of the pillar body 310 facing the interior of the lighting device, and emits light in different directions through the pillars 300. Optionally, the first lighting unit 330 is an LED light strip, which is fixed on a surface of the pillar body 310 facing an inner side of the lighting device in a vertical direction. The first lighting unit 330 on a plurality of the pillars 300 ensure illumination from various angles, with soft and non-glaring light, enabling the object inside the lighting device to be displayed in a better way.

Figure 12:
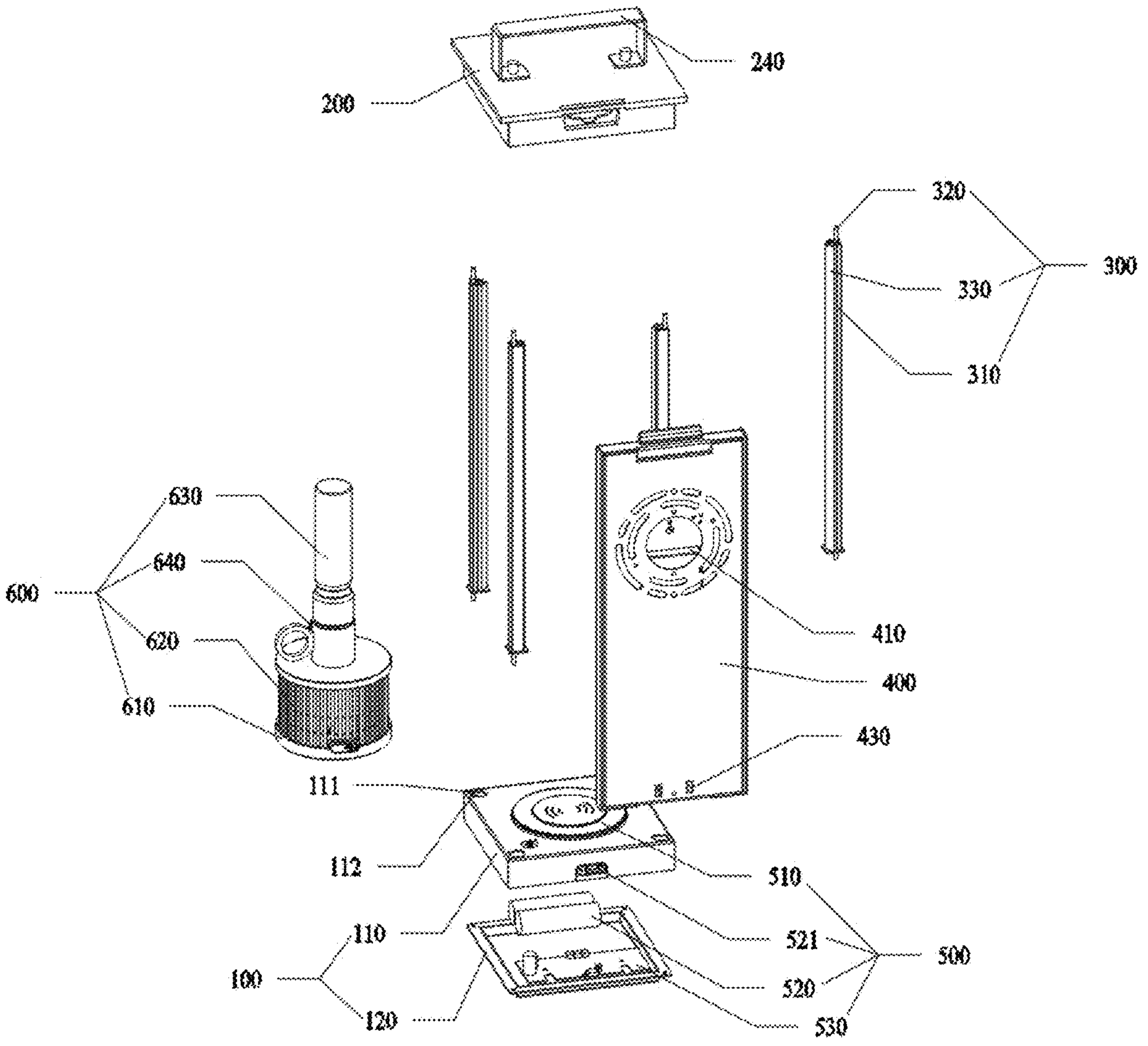
FIG. 12 is an exploded view of a lighting device according to yet another embodiment of the present disclosure from yet another angle.

Further, as shown in FIGS. 10 and 12, the base 100 includes a base body 110 and a base bottom cover 120, where the base body 110 is matched with the base bottom cover 120 to form a receiving space for fixing the power supply unit 500. In addition, the pillars 300 are fixed on the base body 110, a first positioning groove 111 corresponding to a bottom end of the pillar body 310 is formed on the base body 110 of the base 100, a first fixing groove 112 corresponding to a bottom end of the fixing rod 320 is formed at a bottom of the first positioning groove 111, the first positioning groove 111 cooperates with the pillar body 310 to realize positioning of the corresponding pillar 300 during an assembly process, and the first fixing groove 112 cooperates with the fixing rod 320 to realize fixing of the corresponding pillar 300, such that a fixed connection between the base 100 and the pillars 300 is realized, with simple and quick assembly.

Figure 3:
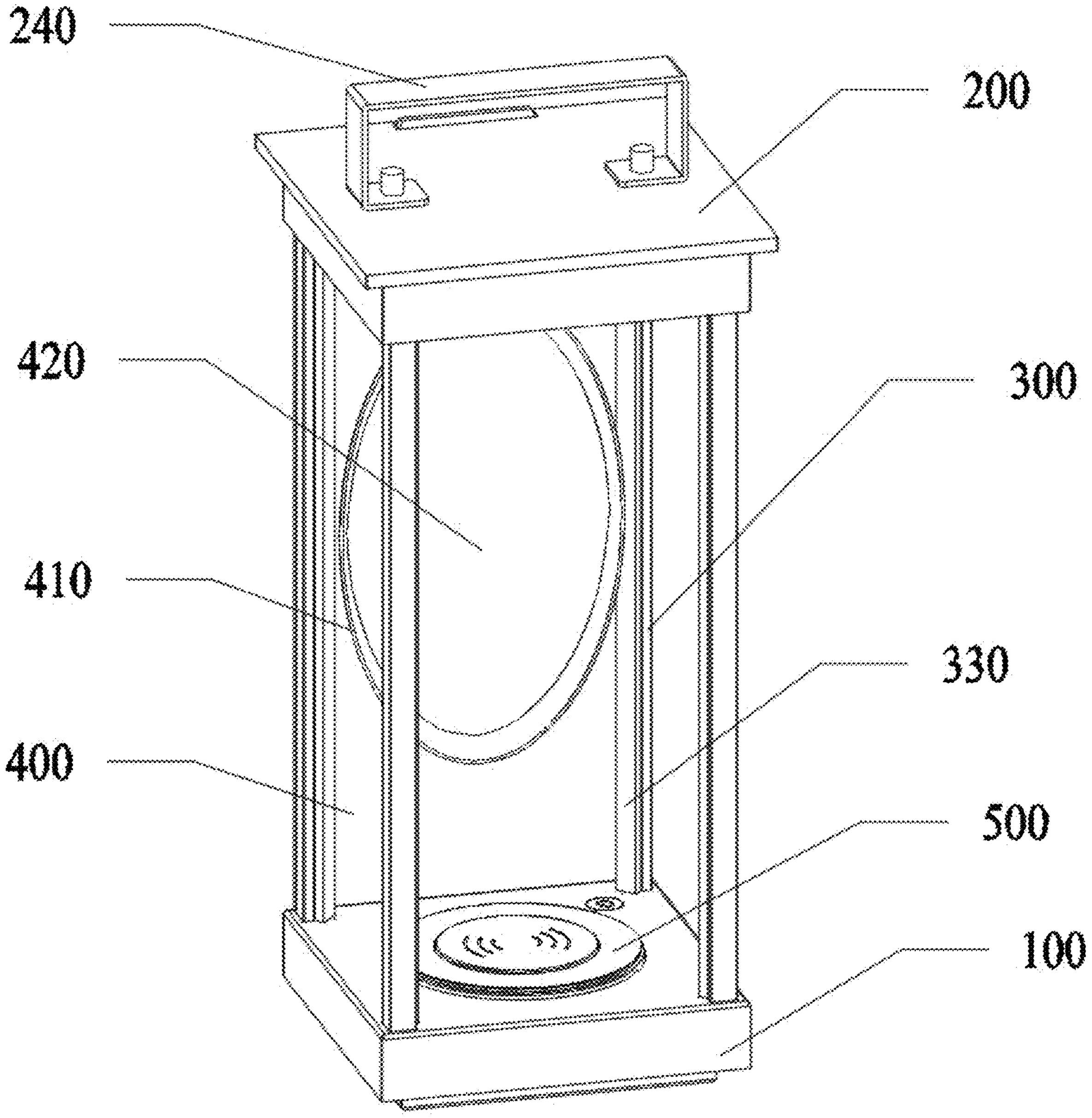
FIG. 3 is a perspective view of a lighting device according to another embodiment of the present disclosure.
Figure 8:
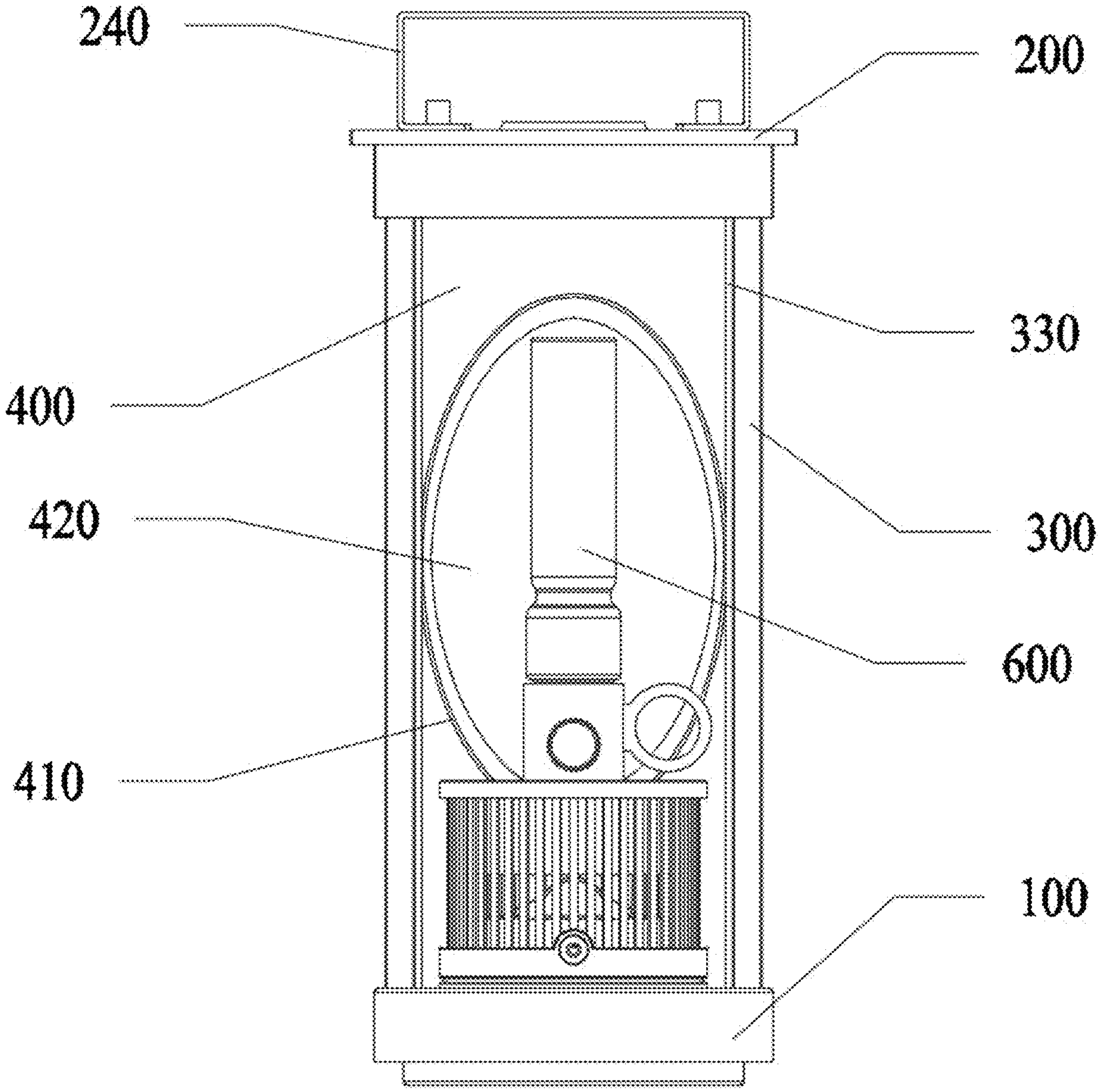
FIG. 8 is a front view of a lighting device according to yet another embodiment of the present disclosure.

Further, as shown in FIGS. 1, 3 and 8, the top plate 200 matches the shape of the base 100 and is correspondingly arranged above the base 100, a second positioning groove 210 corresponding to a top end of the pillar body 310 is formed on the top plate 200, a second fixing groove 220 corresponding to a top end of the fixing rod 320 is formed at a bottom of the second positioning groove 210, the second positioning groove 210 cooperates with the pillar body 310 to realize positioning of the corresponding pillar 300 during an assembly process, and the second fixing groove 220 cooperates with the fixing rod 320 to realize fixing of the corresponding pillar 300, such that a fixed connection between the top plate 200 and the pillars 300 is realized, with simple and quick assembly.

Figure 4:
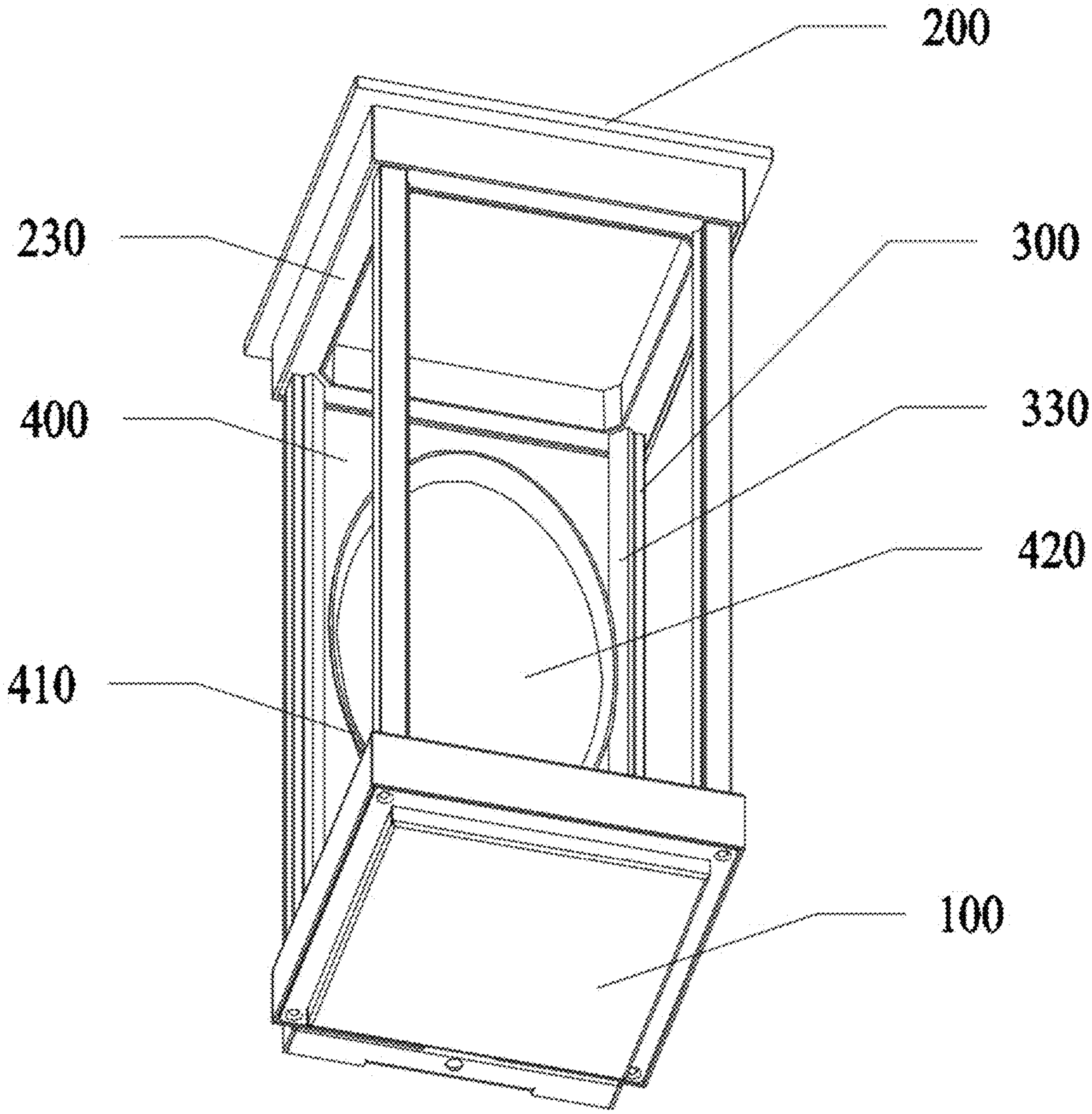
FIG. 4 is a perspective view of a lighting device according to another embodiment of the present disclosure from another angle.
Figure 6:
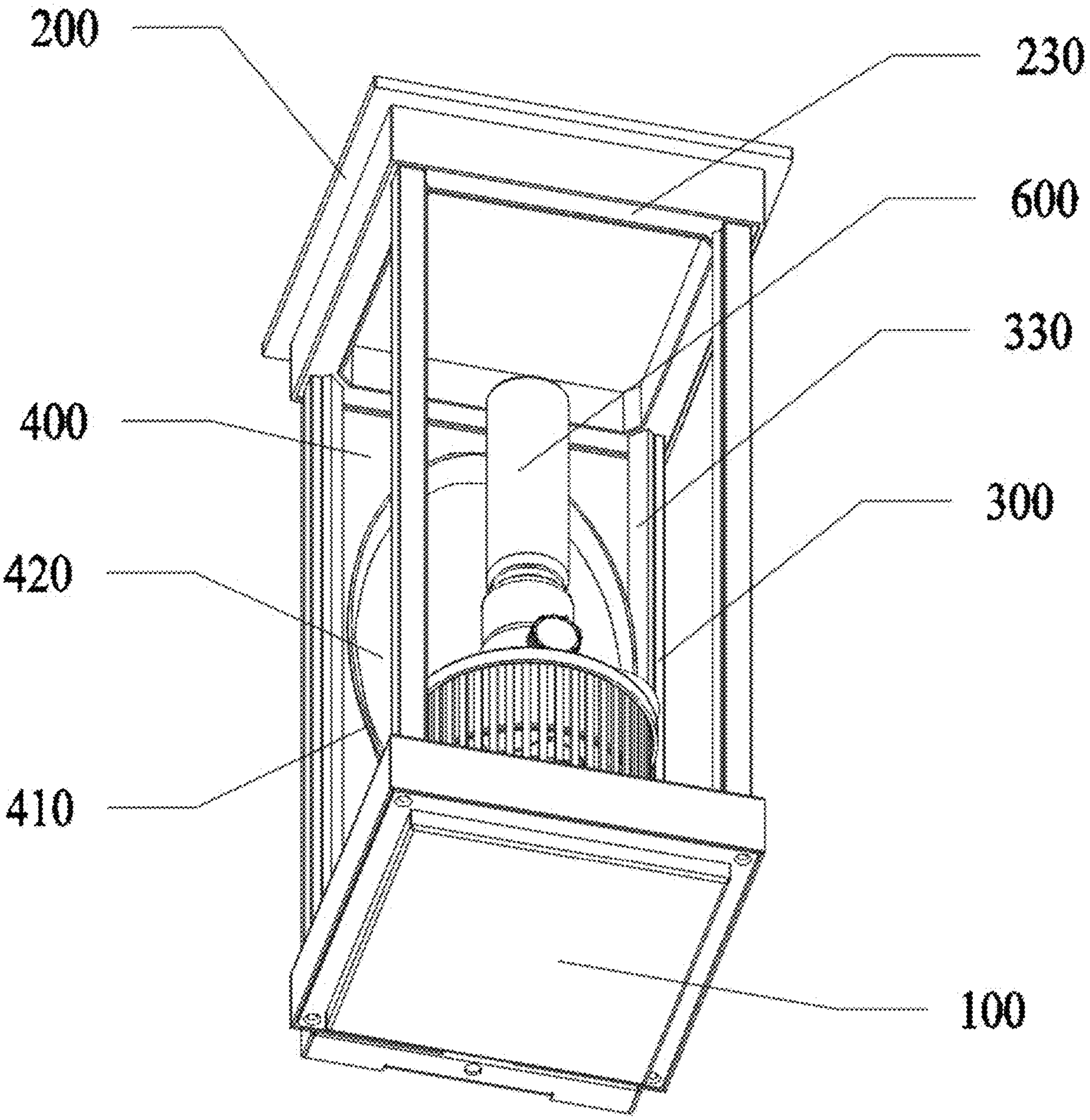
FIG. 6 is a perspective view of a lighting device according to yet another embodiment of the present disclosure from another angle.

Further, as shown in FIGS. 4 and 6, a third lighting unit 230 is arranged on the top plate 200 facing the base 100, and the third lighting unit 230 is fixed between the adjacent pillars 300 and is electrically connected to the power supply unit 500. Optionally, the third lighting unit 230 is an LED light strip. The arrangement of the third lighting unit 230 capable of emitting light downwards, the lighting device has more illumination angles, and top light is provided for the object placed inside the lighting device, which is more conducive to the display of the object.

Further, as shown in FIGS. 1, 4 and 10, the power supply unit 500 is fixed inside the base body 110. The power supply unit 500 is electrically connected to the first lighting unit 330 and the third lighting unit 230, thereby supplying power to the first lighting unit 330 and the third lighting unit 230, and charging the object placed inside the lighting device. Specifically, the power supply unit 500 includes a charging device 510, a charging power supply 520, and a control device 530. As shown in FIGS. 10 and 12, the charging power supply 520 is fixed in the receiving space formed by the base body 110 and the base bottom cover 120, and is connected to an external power source through a charging port 521 located on a side wall of the base 100 to realize charging and electricity storage. The charging power supply 520 is electrically connected to the first lighting unit 330 and the third lighting unit 230, and supplies power to the first lighting unit 330 and the third lighting unit 230 for illumination. Further, the charging power supply 520 is electrically connected to the charging device 510, and provides functions for the charging device 510, which charges power to the object placed inside the lighting device. The charging device 510 is fixed on a surface of the base body 110, specifically corresponding to a center position on a top surface of the base 100, so as to be electrically connected to the object placed on the base 100, and to provide a charging function. Optionally, the charging device 510 is a wireless charger for providing the charging function wirelessly for the object placed on the base 100.

Further, as shown in FIG. 12, the control device 530 is fixed inside the base 100, and a control button is formed on the surface of the base body 110 in a manner that extends out from the top surface of the base 100 for operation by the user. Specifically, the control device 530 is electrically connected to the charging device 510, the first lighting unit 330, and the third lighting unit 230 to control on/off of the charging device 510, the first lighting unit 330, and the third lighting unit 230, and to adjust the brightness of the first lighting unit 330 and the third lighting unit 230, thus achieving control of the lighting device. Optionally, the control device 530 is a touch controller, the user can control on/off of the charging device 510, the first lighting unit 330, and the third lighting unit 230 by long-pressing a button formed by the control device 530 on the top surface of the base 100, and realize three-step dimming of the first lighting unit 330 and the third lighting unit 230 by controlling a touch switch on the control device 530. Optionally, the user can adjust the brightness of the first lighting unit 330 and the third lighting unit 230 sequentially to be 30%, 70% and 100% by touching the button formed by the control device 530 on the top surface of the base 100, thereby achieving quick control of the brightness of the lighting device. The present disclosure supplies power to all the lighting units inside the lighting device in a uniform manner through the power supply unit 500, which is simple to operate and easy to use, and also makes an overall structure of the lighting device more compact and convenient to carry.

Figure 5:
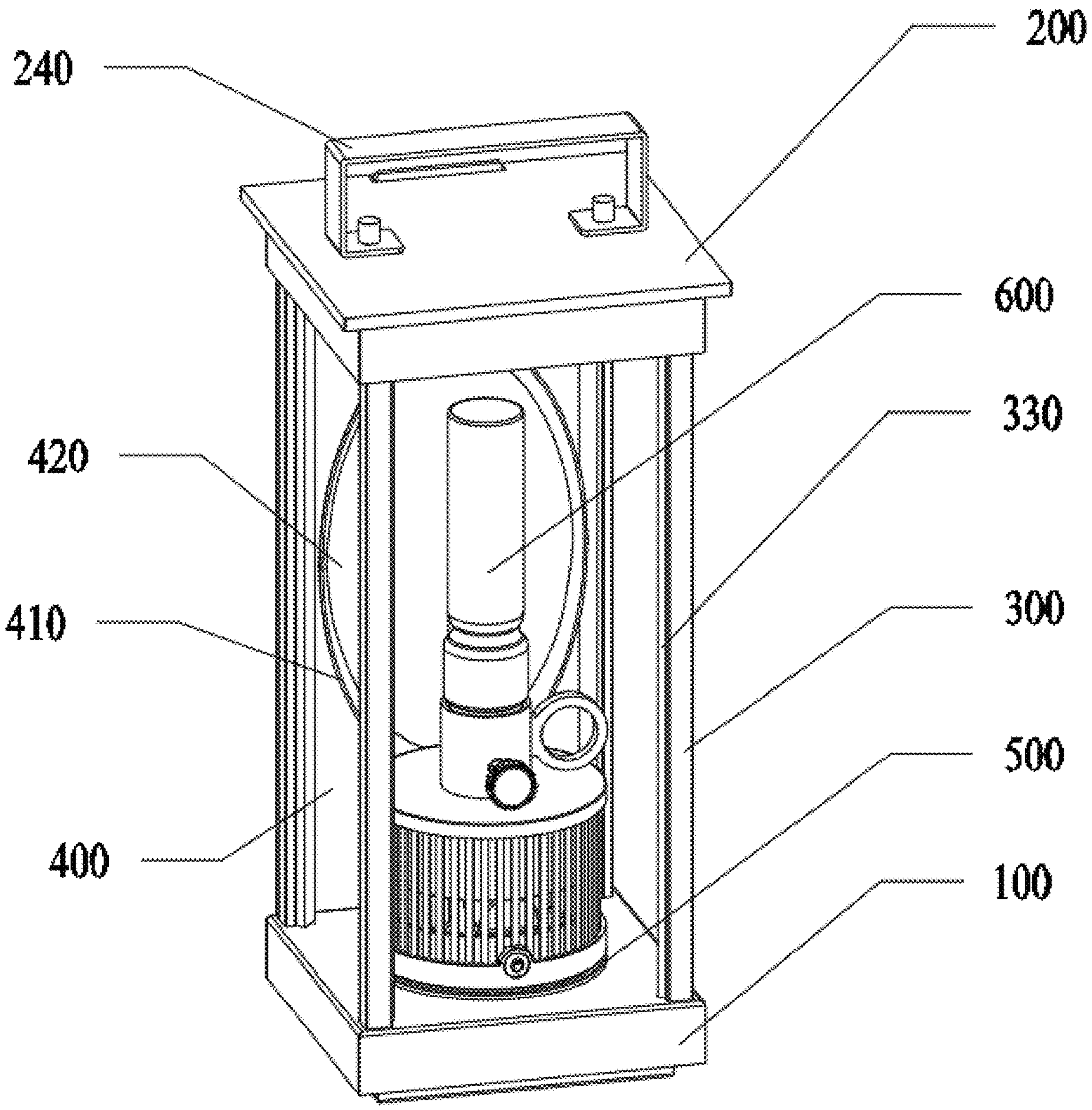
FIG. 5 is a perspective view of a lighting device according to yet another embodiment of the present disclosure.

Further, as shown in FIGS. 5 and 6, the lighting device further includes a fourth lighting unit 600, where the fourth lighting unit 600 is arranged on the base 100 and is detachably connected to the power supply unit 500, and the fourth lighting unit 600 is electrically connected to the power supply unit 500, to obtain electric energy from the power supply unit 500. Specifically, as shown in FIGS. 10 and 11, the fourth lighting unit 600 includes a main body 610, an audio assembly 620, a lighting assembly 630, and a control assembly 640, where the main body 610 forms a base of the fourth lighting unit 600 and is detachably connected to the power supply unit 500, a wireless charging matching device is arranged inside the main body 610 that is electrically connected to the charging power supply 520 through the power supply unit 500 of the charging device 510, so as to supply power to the fourth lighting unit 600; the audio assembly 620 is fixed inside the main body 610 for providing an audio playback function for the fourth lighting unit 600 upon power supply; the lighting assembly 630 is fixed above the main body 610, and is in a lamp tube structure and provides lighting function for the fourth lighting unit 600 upon power supply; and the control assembly 640 is fixed on the main body 610 and is electrically connected to both the audio assembly 620 and the lighting assembly 630, so as to control on/off and working state of the audio assembly 620 and the lighting assembly 630. Optionally, the control assembly 640 is a knob, which is configured to turn on/off the audio assembly 620 and the lighting assembly 630, and adjust the brightness of the lighting assembly 630, by rotating to different settings. By incorporating the fourth lighting unit 600 with multiple functions inside the lighting device, the lighting device is capable of providing the user with more abundant functions, further enriching the application scenarios thereof.

Further, In an embodiment, as shown in FIGS. 3 and 4, the lighting device further includes a rear plate 400, where a shape of the rear plate 400 corresponds to a single frame formed by two adjacent pillars 300, the base 100, and the top plate 200, the rear plate 400 is detachably connected to both the base 100 and the top plate 200, and is fixed between the two adjacent pillars 300. A second lighting unit 410 is arranged on a side of the rear plate 400 facing the interior of the lighting device to cooperate with the first lighting unit 330 to provide a lighting function.

Specifically, as shown in FIGS. 3 and 4, a mirror structure 420 is fixedly arranged on the side of the rear plate 400 facing the interior of the lighting device, and the second lighting unit 410 is fixed between the mirror structure 420 and the rear plate 400. Optionally, the second lighting unit 410 is an LED light strip arranged around the mirror structure 420. The mirror structure 420 is arranged to reflect the light emitted by the first lighting unit 330, further enriching the lighting angles provided by the lighting device. In addition, the mirror structure 420 can reflect the object placed inside the lighting device, such that the lighting device has a better display effect in conjunction with the light emitted by the first lighting unit 330, the second lighting unit 410, the third lighting unit 230, and the fourth lighting unit 600.

Figure 7:
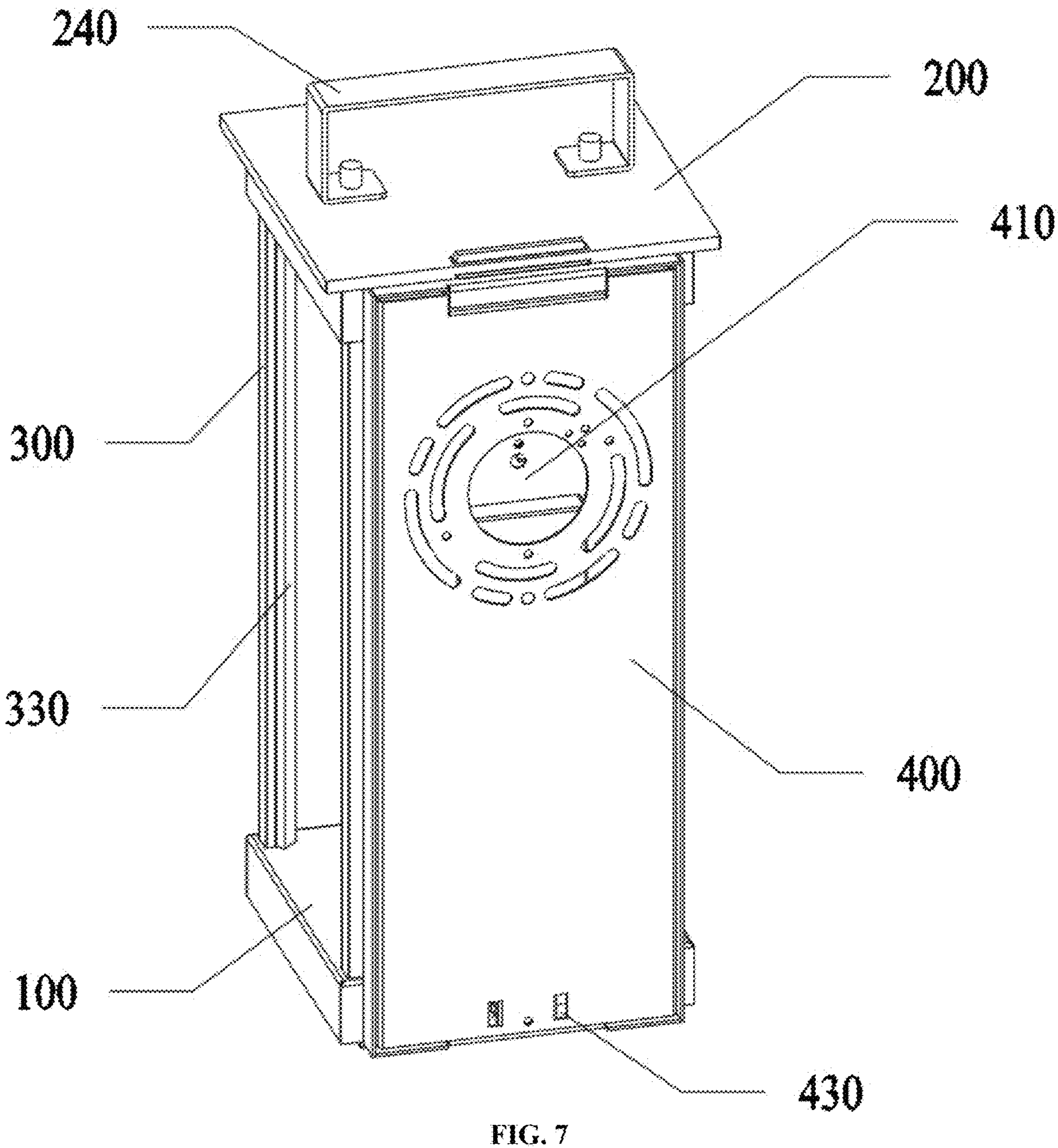
FIG. 7 is a perspective view of a lighting device according to yet another embodiment of the present disclosure from still another angle.

Specifically, as shown in FIGS. 7 and 12, charging interfaces 430 are formed on the rear plate 400. Optionally, the charging interface 430 are arranged at a bottom end of the rear plate 400; and when the bottom end of the rear plate 400 is snap-fitted on the base 100, the charging interfaces 430 correspond to a position of the base 100, the rear plate 400 is connected to the external power source through the charging interfaces 430, thereby supplying power to the second lighting unit 410, the first lighting unit 330 and the third lighting unit 230, such that power consumption of the power supply unit 500 can be avoided and the use time of the lighting device can be prolonged. As shown in FIGS. 10 and 11, a power supply interface 440 is formed at a top end of the rear plate 400; and when the top end of the rear plate 400 is snap-fitted on the top plate 200, the power supply interface 440 is electrically connected to the first lighting unit 330 and the third lighting unit 230, and is configured to supply power to the first lighting unit 330 and the third lighting unit 230, respectively. The arrangement of the rear plate 400 provides the lighting device with additional power supply modes, the first lighting unit 330 and the third lighting unit 230 of the lighting device are connected to the external power source through the rear plate 400, such that the power of the charging power supply 520 in the power supply device 500 cannot be consumed, and the charging power supply 520 becomes more durable. Further, when the rear plate 400 is mounted on the lighting device and connected to a power source, the second lighting unit 410, the first lighting unit 330 and the third lighting unit 230 light up to provide the lighting function for the lighting device.

Figure 9:
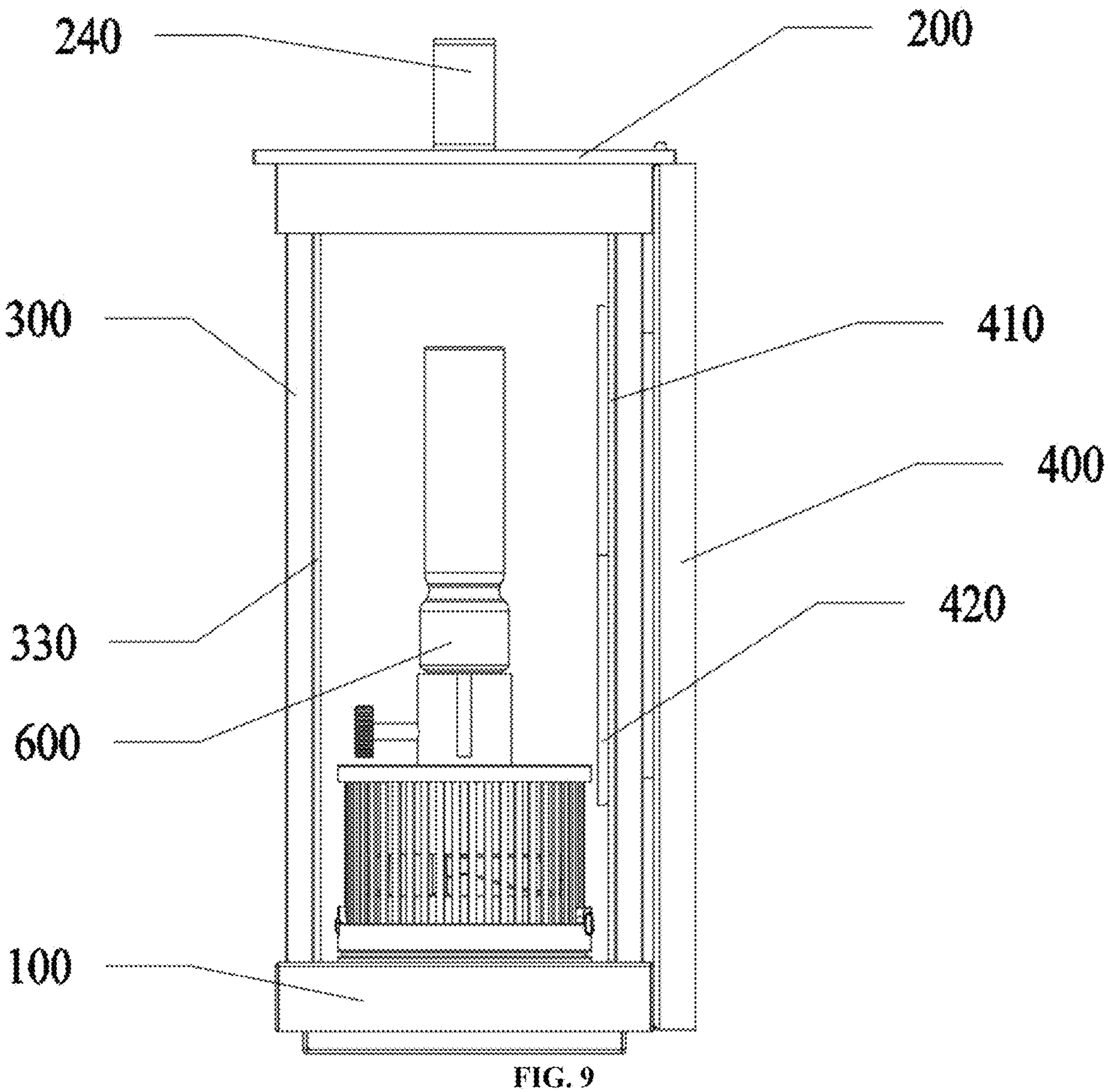
FIG. 9 is a right view of a lighting device according to yet another embodiment of the present disclosure.

Further, as shown in FIGS. 8 and 9, a handle 240 is fixedly arranged at a top of the top plate 200, such that the user can easily grab and carry the lighting device through the handle 240, thereby broadening the application scope of the lighting device.

The following description provides further details of one embodiment of the present disclosure in conjunction with the accompanying drawings.

As shown in FIG. 12, in the base 100, the power supply unit 500 is fixed between the base body 110 and the base bottom cover 120, the power supply unit 500 is exposed through the charging port 521 on a side wall of the base body 110 corresponding to the rear plate 400 to be connected to an external power source for charging. Optionally, the charging port 521 is a Type-C interface. Further, a plurality of the first positioning groove 111 are formed on a surface of the base body 110, the first positioning grooves 111 are arranged corresponding to the bottom of the pillars 300, and specifically, the first positioning grooves are matched to a bottom of the pillar body 310 of each of the pillars 300, to be snap-fitted on the pillar body 310. Further, a first fixing groove 112 is provided at a bottom of each of the first positioning grooves 111, and the first fixing groove 112 corresponds to the fixing rod 320 in each of the pillars 300, such that the fixing rod 320 is fixed through the first fixing groove 112 when the pillar body 310 is snap-fitted in the first positioning grooves 111, thereby ensuring a fixed connection between the base 100 and the pillars 300. Preferably, the first fixing groove 112 is connected to the power supply unit 500 through an electrical wire, and the first lighting unit 330 in the pillar 300 is electrically connected to the power supply unit 500 through the fixing rod 320. Further, the charging device 510 of the power supply unit 500 is arranged at the central position on the top surface of the base body 110, the charging device 510 can be snap-fitted on and connected to the fourth lighting unit 600 and provide power to the fourth lighting unit 600 in a wireless manner, thereby ensuring normal operation of the fourth lighting unit 600.

Further, as shown in FIGS. 11 and 12, each of the pillars 300 includes the pillar body 310, the fixing rod 320 fixed within the pillar body 310 and extending from two ends of the pillar body 310, and the first lighting unit 330 arranged on the side of the pillar body 310 facing the interior of the lighting device. Specifically, the first lighting unit 330 is an LED light strip, a bottom end of the pillar body 310 is fitted into the first positioning groove 111 on the base 100, a top end of the pillar body 310 is fitted into the second positioning groove 210 on the top plate 200, thereby ensuring a fixed connection between the pillar 300, the base 100, and the top plate 200. Further, a number of the pillars 300 are determined according to a shape formed by the base 100 and the top plate 200, for example, when the shape formed by the base 100 and the top plate 200 are rectangular, four pillars 300 are provided; when the shape formed by the base 100 and the top plate 200 are hexagonal, six pillars 300 are provided; and when the shape formed by the base 100 and the top plate 200 are circular, a plurality of the pillars 300 are arranged at fixed central angle intervals. By arranging the first lighting unit 330 on each of the pillars 300 that faces the interior of the lighting device, lighting from various angles can be provided, and a better display effect of the object placed inside the lighting device can be provided.

Further, as shown in FIGS. 9 and 10, a top of the rear plate 400 is snap-fitted on the top plate 200, a bottom of the rear plate 400 is snap-fitted on the base 100, and the mirror structure 420 is located in a center position of the rear plate 400, such that the object placed inside the lighting device can be displayed with better effects through the mirror reflection of the mirror structure 420. In an embodiment, when the fourth lighting unit 600 is arranged in the lighting device, the mirror structure 420 is capable of reflecting the light of the fourth lighting unit 600, such that a brighter lighting effect can be realized. Further, the second lighting unit 410 is arranged between the mirror structure 420 and the rear plate 400, such that softer light can be provided. Optionally, the second lighting unit 410 is an annular LED light strip, and the mirror structure 420 is an elliptical mirror, and the second lighting unit 410 is arranged around a rear of the mirror structure 420, such that a softer lighting effect is provided for the lighting device.

Further, as shown in FIGS. 7 and 12, the charging interfaces 430 are formed on a side of the bottom of the rear plate 400 away from the base 100, the power supply interface 440 is formed on a side of the top of the rear plate 400 that faces the top plate 200, and the rear plate 400 is electrically connected to the external power source through the charging interfaces 430 to supply power to the second lighting unit 410, as well as to supply power to the first lighting unit 330 and the third lighting unit 230 through the power supply interface 440, such that the lighting device can be provided with richer power supply means, use time of the power supply unit 500 in the lighting device can be prolonged, and the application scenarios of the lighting device are further enriched.

Further, as shown in FIG. 2, the handle 240 is arranged at the top of the top plate 200, making it easier for the user to carry the lighting device. Further, as shown in FIG. 11, the top plate 200 is provided with the second positioning groove 210 and the second fixing groove 220 corresponding to the pillars 300, where the second positioning groove 210 is matched with the pillar body 310 inside the pillar 300 in a shape to be snap-fitted on the pillar body 310; the second fixing groove 220 is formed at a bottom of the second positioning groove 210 and corresponds to the fixing rod 320 inside the pillar 300, such that a position of the fixing rod 320 is fixed when the pillar body 310 is snap-fitted in the second positioning groove 210, and a connection between the top plate 200 and the pillars 300 is realized. Further, the third lighting unit 230 is arranged on the top plate 200 that is directed toward the base 100, the third lighting unit 230 is arranged between two adjacent second positioning grooves 210, that is, after the assembly is completed, the third lighting unit 230 is located between the two adjacent pillars 300. Optionally, the third lighting unit 230 is an LED light strip. The third lighting unit 230 is arranged on the top plate 200 to emit light toward the base 100, such that the lighting device can be provided with illumination from various angles through the cooperation between the third lighting unit 230 and the first lighting unit 330, as well as between the second lighting unit 410, and the fourth lighting unit 600, and a better display effect of the object placed inside the lighting device can be provided.

In summary, the present disclosure provides alighting device, including abase, atop plate, a power supply unit, and pillars. Specifically, the top plate is located above the base and is arranged corresponding to the base, the power supply unit is fixed on the base, both ends of each of the pillars are fixedly connected to the base and the top plate, a first lighting unit is arranged on a side of one of the pillars facing an interior of the lighting device, and the first lighting unit is electrically connected to the power supply unit. In the present disclosure, a plurality of frames capable of displaying an internal space is formed by combining the pillars with the base and the top plate, in addition, the first lighting units in different directions are arranged to achieve the lighting function, the power supply unit is integrated into the base to provide the charging function, which not only ensures that the lighting device can provide illumination from various angles, but also enables the lighting device to charge the object placed inside. By combining with the lighting function, the user can showcase the object placed inside the lighting device in a more delicate and aesthetical manner, enriching use scenarios for the lighting device.

It should be understood that those skilled in the art can make equivalent substitutions or modifications based on the technical solutions and inventive concepts of the present disclosure, and all these substitutions or modifications should fall within the scope of protection of the appended claims of the present disclosure.

What is claimed is:

1. A lighting device, comprising:

a base;

a top plate, wherein the top plate is located above the base and being arranged corresponding to the base;

a power supply unit, wherein the power supply unit is fixed on the base; and pillars, wherein both ends of each of the pillars are fixedly connected to the base and the top plate, a first lighting unit is arranged on a side of one of the pillars facing an interior of the lighting device, and the first lighting unit is electrically connected to the power supply unit, further comprising a rear plate, wherein the rear plate is detachably connected to both the base and the top plate, and a second lighting unit is arranged on a side of the rear plate facing the interior of the lighting device.

2. The lighting device according to claim 1, wherein a third lighting unit is arranged on the top plate facing the base, and the third lighting unit is fixed between the adjacent pillars and is electrically connected to the power supply unit.

3. The lighting device according to claim 2, wherein the power supply unit comprises:

a charging device, wherein the charging device is arranged in a center position on a top surface of the base for charging an object placed inside the lighting device;

a charging power supply, wherein the charging power supply is fixed inside the base, a charging port is formed on a side wall of the base, and the charging power supply is electrically connected to the power supply unit, the first lighting unit and the third lighting unit; and a control device, wherein the control device is fixed inside the base and extends out from the top surface of the base, and the control device is electrically connected to the charging device, the first lighting unit, and the third lighting unit, so as to control on/off of the charging device, the first lighting unit, and the third lighting unit, and to adjust brightness levels of the first lighting unit and the third lighting unit.

4. The lighting device according to claim 3, wherein the charging device a wireless charger, and the control device is a touch controller.

5. The lighting device according to claim 3, further comprising a fourth lighting unit, wherein the fourth lighting unit comprises:

a main body, wherein the main body is detachably connected to the charging device and is capable of supplying power to the fourth lighting unit through the charging device;

an audio assembly, wherein the audio assembly is fixed inside the main body for providing an audio playback function for the fourth lighting unit;

a lighting assembly, wherein the lighting assembly is fixed above the main body for providing a lighting function for the fourth lighting unit; and a control assembly, wherein the control assembly is electrically connected to the audio assembly and the lighting assembly for controlling on/off and working states of the audio assembly and the lighting assembly.

6. The lighting device according to claim 2, wherein the rear plate further comprises:

a mirror structure, wherein the mirror structure is fixed on a side of the rear plate facing the interior of the lighting device, and the second lighting unit is fixed between the mirror structure and the rear plate;

a power supply interface, wherein the power supply interface is arranged corresponding to the top plate and being electrically connected to the first lighting unit and the third lighting unit; and charging interfaces, wherein the charging interfaces are arranged on the rear plate for being connected to an external power source to supply power to the second lighting unit and the power supply interface.

7. The lighting device according to claim 1, wherein a handle is fixedly arranged at a top of the top plate.

8. A lighting device, comprising:

a base;

a top plate, wherein the top plate is located above the base and being arranged corresponding to the base;

a power supply unit, wherein the power supply unit is fixed on the base; and pillars, wherein both ends of each of the pillars are fixedly connected to the base and the top plate, a first lighting unit is arranged on a side of one of the pillars facing an interior of the lighting device, and the first lighting unit is electrically connected to the power supply unit, wherein each of the pillars comprises:

a pillar body, wherein two ends of the pillar body are fixedly connected to the base and the top plate;

a fixed rod, wherein the fixed rod is fixed inside the pillar body and extends out from two ends of the pillar body, and is fixedly connected to both the base and the top plate; and the first lighting unit, wherein the first lighting unit is fixed on a side of the pillar body facing the interior of the lighting device.

9. The lighting device according to claim 8, wherein a first positioning groove corresponding to a bottom end of the pillar body is formed on the base, and a first fixing groove corresponding to a bottom end of the fixing rod is formed at a bottom of the first positioning groove, such that a connection between the base and the pillars is realized; and a second positioning groove corresponding to a top end of the pillar body is formed on the top plate, and a second fixing groove corresponding to a top end of the fixing rod is formed at a bottom of the second positioning groove, such that a fixed connection between the top plate and the pillars is realized.

* * * * *